United States Patent [19]

Bavaro

[11] Patent Number: 5,416,384
[45] Date of Patent: May 16, 1995

[54] BACK-UP LIGHTING SYSTEM

[76] Inventor: Joseph Bavaro, 16 Pheasant La., Topsfield, Mass. 01983

[21] Appl. No.: 21,197

[22] Filed: Feb. 23, 1993

[51] Int. Cl.[6] .................. H05B 39/04; H05B 41/16; H05B 41/29; H05B 41/36

[52] U.S. Cl. ..................... 315/86; 315/129; 315/135; 315/155; 315/159; 315/240; 315/260; 315/DIG. 2; 320/2; 320/48

[58] Field of Search .............. 315/33, 86, 93, 120, 315/127, 128, 129, 130, 131, 132, 133, 134, 135, 149, 175, 158, 159, 219, 224, 240, 360, 155, DIG. 2, DIG. 5; 307/150, 157; 320/2, 29, 48

[56] References Cited

U.S. PATENT DOCUMENTS

| | | | |
|---|---|---|---|
| 1,922,079 | 8/1933 | Dixon | 315/86 X |
| 2,067,653 | 1/1937 | Witmer et al. | 315/86 |
| 3,486,068 | 12/1969 | Dunn et al. | 315/86 X |
| 3,641,487 | 2/1972 | Rogers et al. | 340/931 |
| 3,644,783 | 2/1972 | Snyder | 315/86 X |
| 3,904,947 | 9/1975 | Crews | 320/2 |
| 4,060,701 | 11/1977 | Epley | 179/175 |
| 4,144,462 | 3/1979 | Sieron et al. | 315/86 X |
| 4,686,424 | 8/1987 | Nuckolls et al. | 315/86 |
| 4,977,351 | 12/1990 | Bavaro et al. | 315/86 X |
| 5,154,504 | 10/1992 | Helal et al. | 315/86 X |
| 5,220,248 | 6/1993 | Wang | 315/240 |
| 5,252,891 | 10/1993 | Huang | 315/86 |

*Primary Examiner*—David Mis
*Attorney, Agent, or Firm*—Wolf, Greenfield & Sacks

[57] ABSTRACT

This is an emergency lighting system that provides an emergency driving voltage to drive at least one lamp when the AC power input to the lamp is detected as absent. A rechargeable battery pack and recharging circuit are contained in a first modular housing, and driving circuitry is contained in a second modular housing. An easily accessible, manually-operable service switch disables the provision of battery power to the driving circuitry (when the switch is in the open state), thereby allowing substantial reduction in installation time and cost. A test switch is included to emulate power failures. A transmitter and receiver mechanism allow a user to remotely disable the provision of battery power to the driving circuitry, thereby offering battery power conservation, if the emeregency lamplight is not needed. Likewise, a photo-sensing mechanism disables the provision of battery power to the driving circuitry, if there is sufficient ambient light.

8 Claims, 6 Drawing Sheets

BACK-UP LIGHTING SYSTEM

FIELD OF THE INVENTION

This invention relates to back-up lighting systems and, more particularly, to systems that provide emergency power when AC mains power fails.

DESCRIPTION OF THE PRIOR ART

Attempts have been made in the prior art to provide back-up lighting in the event that AC mains power fails. Generally, the prior art has employed two basic architectures, both of which have several common features. To begin with, most embodiments of the prior art use a DC battery back-up and recharging circuit. In addition, most embodiments use an AC powered relay to detect the absence of AC mains power. Lastly, most embodiments, upon detecting the absence of AC mains power, drive back-up lamps with emergency AC power, which is converted from the DC battery power by an inverter. There are, however, several differences between the architectures. These differences are briefly outlined below.

In the first basic prior art architecture, a DC battery is connected to an inverter circuit when an AC relay detects the absence of AC mains power. The AC voltage, produced by the inverter, drives either the standard lamps within the lighting fixture or dedicated back-up lamps.

In the second basic prior art architecture, a rectifier receives AC mains voltage and produces a DC output. A switching mechanism using an AC relay receives both the rectified voltage and the DC back-up battery voltage. If the AC relay detects the absence of AC mains power, the battery voltage is selected. If AC mains power is present, the rectified voltage is selected. The selected voltage is received by an inverter, which produces an AC voltage to drive the lamps.

Generally, both prior art architectures have been prohibitively expensive for the mass market because of their costly inverter circuits and their significant battery capacity requirements. In addition, the use of AC relays adds cost and susceptibility to AC spikes.

In back-up lighting systems, battery life is critical. The typical battery types used, e.g., Nicad batteries, are rechargeable, but heat-sensitive. Most prior art systems generally fail to consider the batteries' charge state when providing recharging current. Instead, these systems provide recharging current to the batteries whenever AC mains power is present, even if the batteries are fully charged. The superfluous recharging current increases the heat within the batteries, thus degrading battery life.

In addition, the prior art generally fails to exploit other possible battery-life conservation methods. For example, AC mains voltage may fail during daylight hours when emergency light is likely unnecessary. Furthermore, even if AC mains power fails at night, back-up lighting may be unnecessary, because, for example, the occupants may be asleep or because they may not need the use of the particular room with the back-up system. There are too many instances to mention in which the user will not desire lamplight, even though AC mains power is absent. Yet, most prior art systems ignore these factors and provide back-up light upon the mere detection of the absence of AC mains power.

Reliability is also critical in back-up lighting systems. Back-up lighting systems can fail for numerous reasons, including manufacturing defects and faulty installation. Yet, most prior art systems do not provide an easy-to-use testing mechanism. Consequently, it would be desirable for a back-up lighting system to provide a mechanism to facilitate frequent on-site testing, thereby improving the likelihood that the system will be operational when an emergency arises.

Furthermore, even if a system tests positively, the batteries may discharge, for example, if the system is activated by a power outage. The testing mechanism described above will not indicate whether the recharging components are operational. Consequently, it would be desirable if back-up lighting systems indicated whether the batteries and recharging circuitry are functioning properly.

Most prior art systems are grossly time-consuming and expensive to install. This is largely the result of the following. The back-up battery is usually installed in a charged state. Furthermore, during installation, AC mains power is usually disconnected from the system. Since AC mains power is absent as a result of the disconnection, the back-up lighting system will react as if an emergency exists. As a result, the batteries would soon become exhausted. To prevent this, installers typically cut the necessary lines to disconnect the batteries from the power-consuming components. When AC mains power is eventually connected, the lines are spliced. Accessing and splicing the lines can take 45 minutes per lamp. Many installation sites have several back-up lighting systems, thereby compounding the cost and delay.

Accordingly, there is a need in the market for a back-up lighting system that overcomes the prior art's shortcomings.

It is an object of the invention to reduce the cost, increase the energy efficiency, ease installation, and improve the reliability of back-up lighting systems.

SUMMARY OF THE INVENTION

In accordance with the above, the present invention provides an improved back-up lighting system. The back-up lighting system utilizes a modular design to include driving circuitry, a rechargeable and replaceable battery pack, battery recharging circuitry, DC relays to connect battery back-up to the driving circuitry and disconnect AC mains power from the lamp circuitry, user controls, a photo-sensing mechanism, and a test mechanism.

The present invention utilizes modular design to separate the heat-sensitive batteries from the heat-producing driving circuitry, facilitate manufacturing efforts, improve marketability of components, and allow components to be more easily incorporated into a wider range of applications than just household lamps.

Unlike the prior art, which drives lamps with AC, one embodiment of the invention drives lamps with a DC voltage during emergency mode. By driving the lamps with DC, less battery capacity is needed, and lower current is realized within the circuitry.

A low cost embodiment of the invention drives a dedicated incandescent lamp with a DC battery, when AC mains power is detected as absent.

Another embodiment of the invention drives the lamps during emergency mode with AC power from a timing circuit that produces a more efficient driving voltage after the lamps are ionized. This embodiment utilizes a replaceable battery pack to reduce the overall lifetime cost of the system in comparison to prior art systems which require that the system to be replaced when the batteries fail. Moreover, this embodiment incorporates several novel features further discussed below.

Another embodiment of the invention utilizes circuitry to detect superfluous recharging current. The circuitry prevents superfluous recharging current from being supplied to the DC battery back-up, thereby extending battery life and avoiding cell damage.

One embodiment includes a manually-operable service switch to disconnect battery back-up from the power-consuming components. The service switch substantially reduces installation time by obviating the need for cutting and splicing wires.

One embodiment includes a hand-held transmitter to transmit a signal to a receiver within the lighting system. Upon detecting such signal, the receiver disconnects the DC battery from the power-consuming components of the system.

To further conserve battery power, one embodiment includes a photo-sensor to disconnect battery back-up from the power-consuming components, if there is sufficient ambient light to obviate the need for lamplight.

Another embodiment includes a push test-switch or similar mechanism to allow easy testing of the system. The test-switch disconnects AC mains power from the back-up lighting system to emulate an emergency condition. If the lamp does not light, the user knows repair is needed.

In a different embodiment, a test mechanism is implemented in the hand-held control. The hand-held transmitter provides a separate signal for test purposes to activate switches to disconnect AC mains power. Again, if the lamp does not light when the switch is activated the user knows repair is needed.

BRIEF DESCRIPTION OF THE DRAWINGS

The invention will become more apparent from the following detailed specification and drawing in which.

DETAILED DESCRIPTION OF THE INVENTION

Figure 1:
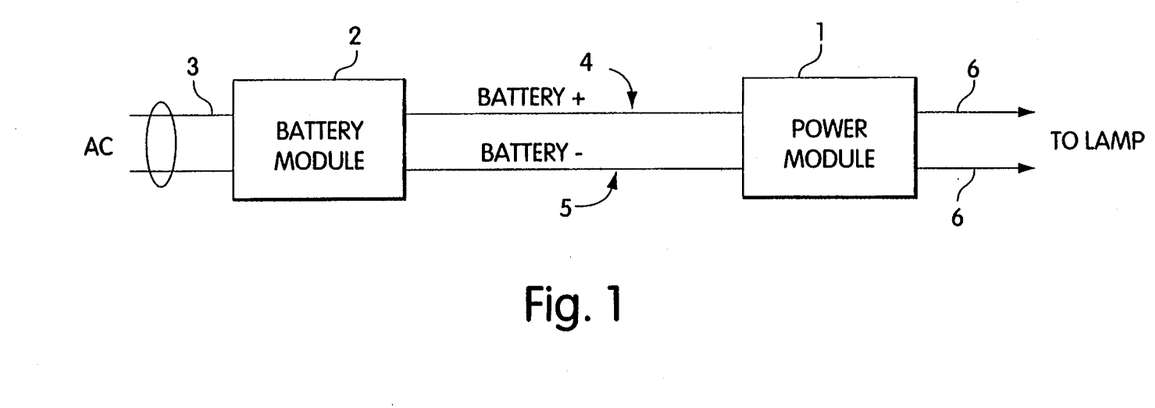
FIG. 1 is a logic-block diagram of a back-up power system.

FIG. 1 is a logic-block diagram of a modular back-up lighting system. The back-up lighting system includes a power module 1 and a battery module 2. The battery module 2 receives an AC voltage on input lines 3 from AC mains power. Battery module 2 provides a DC voltage on output lines 4 and 5. Power module 1 receives the DC voltage on lines 4 and 5 and provides a driving voltage on lines 6 to drive the lamps. As will be described below, the driving voltage will be either AC or DC, depending on the particular embodiment of the power module.

The modular design separates the batteries within battery module 2 from the heat-producing components within power module 1. In addition, modular design facilitates manufacturing efforts and improves the marketability of individual components. Furthermore, modular components are more easily incorporated into a wide range of applications. For example, the power module 1 and battery module 2 can be incorporated into lighting systems for highway exit signs and the like.

Figure 2:
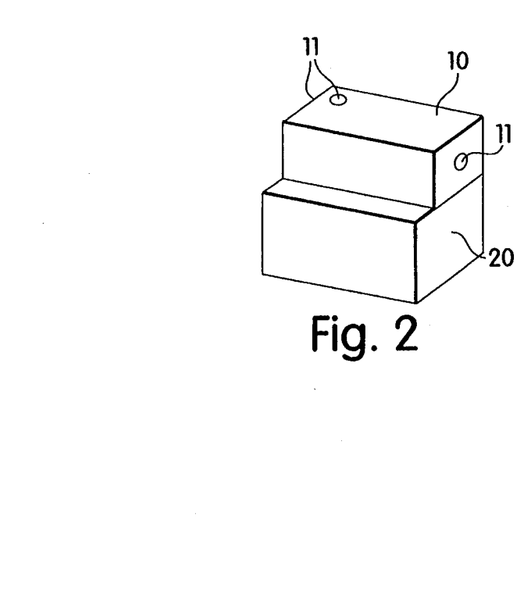
FIG. 2 is a perspective view of the battery module housing and the power module housing.

FIG. 2 is a perspective view of power module 10 connected to a battery module 20. The two housings may be connected by a nipple (not shown) or the like. As will be described below, service switch 11 disconnects battery power from the power module. FIG. 2 suggests several alternative placements for service switch 11. Though not shown, the service switch can be alternatively mounted on lighting trim and the like to facilitate access to the switch.

Figure 3:
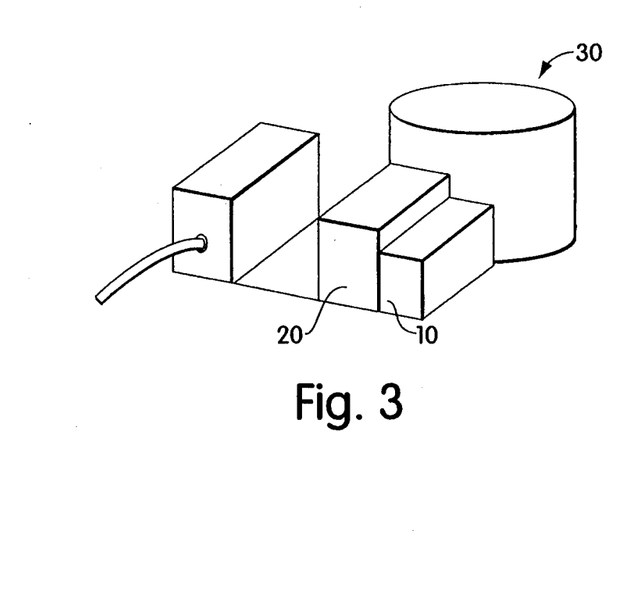
FIG. 3 is a perspective view of the back-up power system mounted on a lighting system.

In this regard, refer to FIG. 3 for an illustration of one particular placement. FIG. 3 is a perspective view of power module 10, battery module 20, and lamp container 30. Service switch 11 is on a panel of power module 10 that abuts lamp container 30. Lamp container 30 has an opening (not shown) to provide access to the switch. In this manner, the service switch can be activated through the lamp container, thereby greatly facilitating installation as no access to the system's internals is needed to cut or splice wires. As readily seen, power module 10 and battery module 20 can be easily integrated into various lighting fixture designs and constructions.

Figure 4:
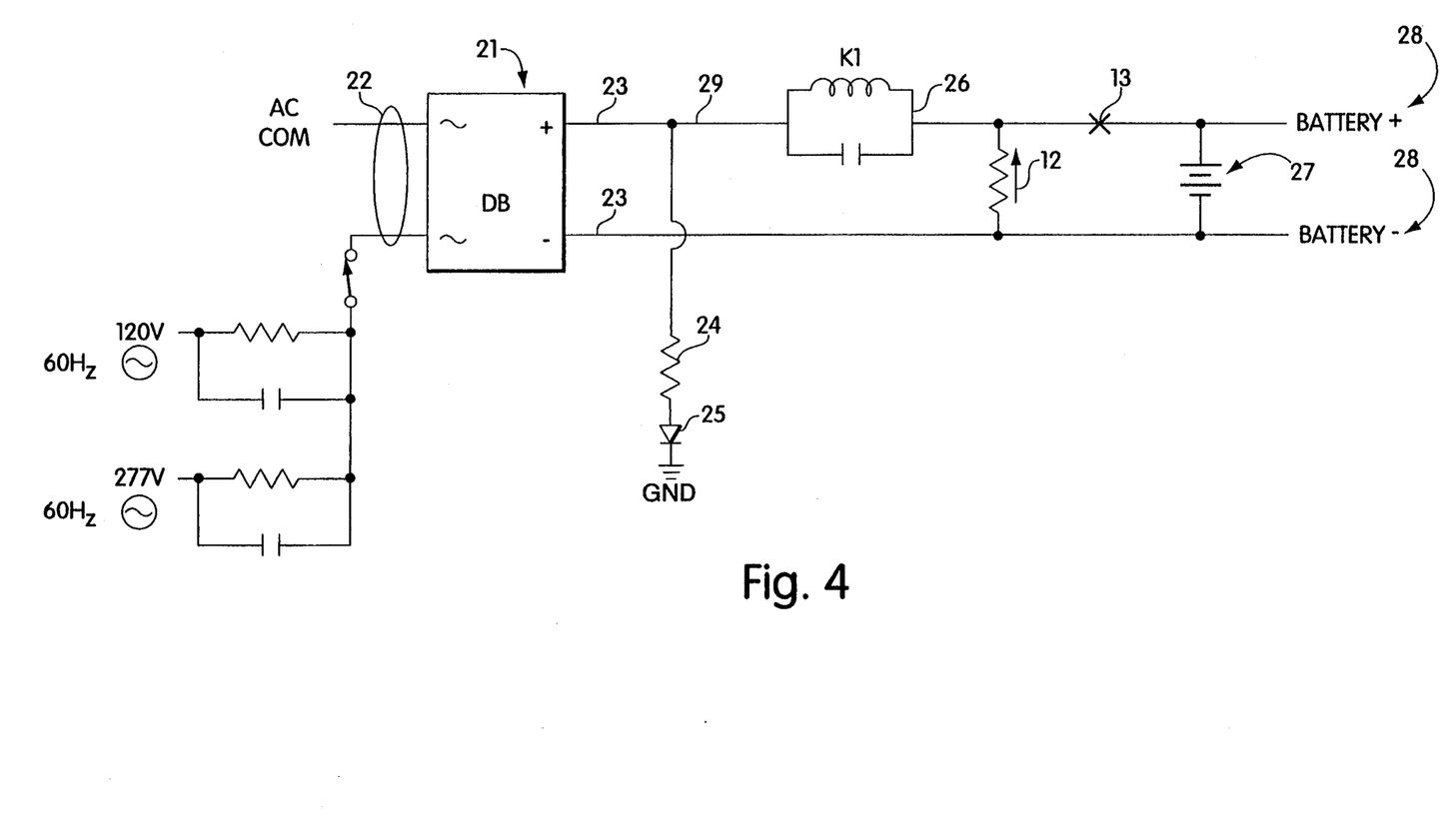
FIG. 4 is an electrical-schematic of one embodiment of the battery recharging circuitry.

FIG. 4 is a schematic diagram of a preferred embodiment of battery module 20. The battery capacity is modified to correspond to the various power modules embodiments by adding or removing battery cells. Diode bridge rectifier 21 receives an AC voltage on lines 22. Alternative rectifier designs can be employed in its place. As shown, the received AC voltage can be 120 volts at 60 Hz and 277 volts at 60 Hz, though inputs such as 208 volts at 60 Hz and 277 at 60 Hz are easily realized. Reference lines 23 transmit the rectified voltage.

Resistor 24 and LED 25 indicate whether a recharging current is being produced. Alternative biasing arrangements can be used. LED 25 is desirably mounted within the lighting fixture or the fixture's trim so that it can be easily monitored by the user.

DC relay circuit 26 receives the positive reference line 29 of DC voltage and activates switches (described below) within the power module 10. From the description below, it will be apparent that these switches can be alternatively placed within the battery module. These switches connect battery back-up to the driving circuitry and connect the lamps to the emergency driving voltage. Resistor 12 prevents an inductive feedback if batteries 27 are removed. The DC relay is less costly and less susceptible to AC spikes.

Rechargeable batteries 27 can be of Nicad or similar types. The battery voltage is transmitted on battery lines 28.

Superfluous recharging current creates heat in the batteries, thereby damaging the battery cells. Current control relay contact 13 disconnects the recharging current from the batteries 27, if the batteries are sufficiently charged. Current control relay contact 13 can employ heat sensing or other techniques known in the art to sense superfluous current. For example, a bimetallic heat sensing relay can be used.

Test switch 14 connects AC mains power to the system. If the switch is opened, however, an emergency condition is emulated. This switch can be of manually-operable type, but at least one embodiment includes test switch functionality with a hand-held control. (Further description of the hand-held control is provided below.)

It has been realized that some lamp types, e.g., circle line, can be ionized by a DC voltage. A DC driving system significantly reduces cost, as less costly driving circuitry and less battery capacity are needed. In a DC driving system, after the lamp is ionized, the inductance of the lamp causes the driving voltage to drop, e.g., an initial 1000 V would drop to 300 V. Less battery capacity is needed, as the lamp, in effect, does not need to be continually re-ionized, as in AC driving embodiments.

Figure 5:
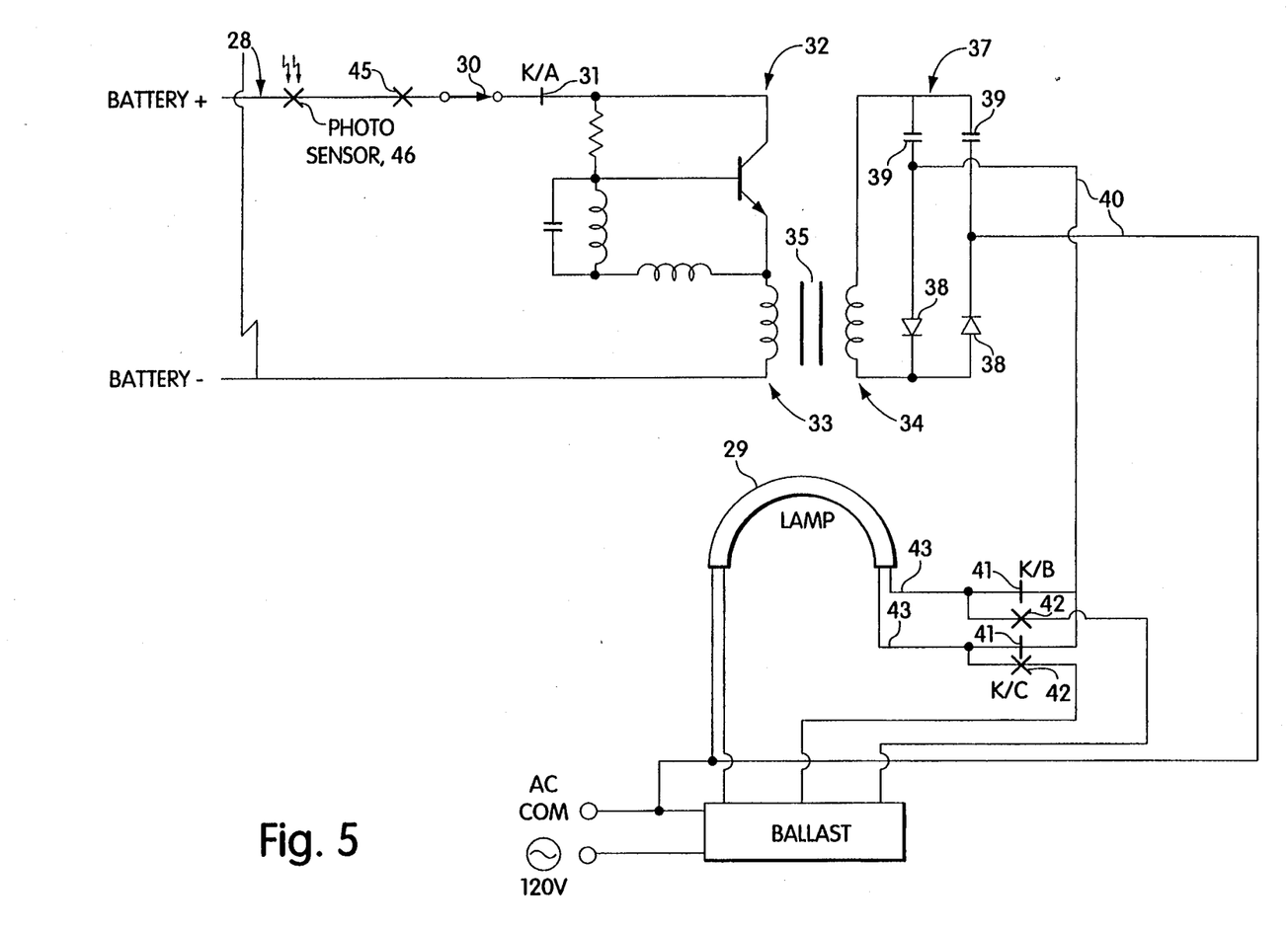
FIG. 5 is an electrical schematic of one embodiment of a power module that provides a DC driving voltage.

To this end, FIG. 5 is a schematic diagram for one embodiment of a power module that drives lamp 29 with a DC voltage. This embodiment can drive a lamp for 3 hours. Though lamp 29 is illustrated as a circle line type, this embodiment can be used with lamps having similar characteristics concerning ionization by DC voltages. Lines 28 receive a DC voltage (7.2 V) from a battery module (shown in FIG. 4). Manually-operable service switch 30, if open, prevents the transmission of power on positive reference line 44. Likewise, relay contact 45 prevents the transmission of power if the corresponding relay is activated. As will be described below, the corresponding relay is part of a hand-held control mechanism (see Description of the Prior Art for examples of when emergency power may be unnecessary). Similarly, photo-sensor contact 46 prevents transmission of power if there is sufficient ambient light. Photo sensor contact 46 can use reverse biased phototransistors and the like.

When DC relay circuit 26 (FIG. 4) releases due to the absence of AC mains power, relay contact 31 closes, as shown. Consequently, single transistor inverter 32 of conventional design receives DC voltage on lines 28 and produces an AC voltage of predetermined frequency. The AC voltage is transmitted to primary winding 33 of step-up transformer 35, which couples with secondary winding 34. Secondary winding 34 transmits a corresponding AC voltage on line 36. AC voltage on line 36 is rectified by rectifier bridge 37, comprised of diodes 38 and capacitors 39. Inverter 32 and rectifier bridge 37 can use other circuit designs to obtain similar results. Lines 40 transmit the rectified power to relay contacts 41, which close, as shown, in response to DC relay circuit 26 (FIG. 4). Relay contacts 42 open, as shown, when DC relay circuit 26 closes relay contacts 41. Thus, when AC mains power is present, lamp 29 is supplied power via lines 43 from the lamps normal power components (e.g., Ballast), but when AC mains power becomes absent, lamp 29 is driven by DC power via lines 40. Furthermore, relay contacts 41 protect inverter 32 from ballast-caused ripples and spikes, which can occur during non-emergency mode.

Figure 6:
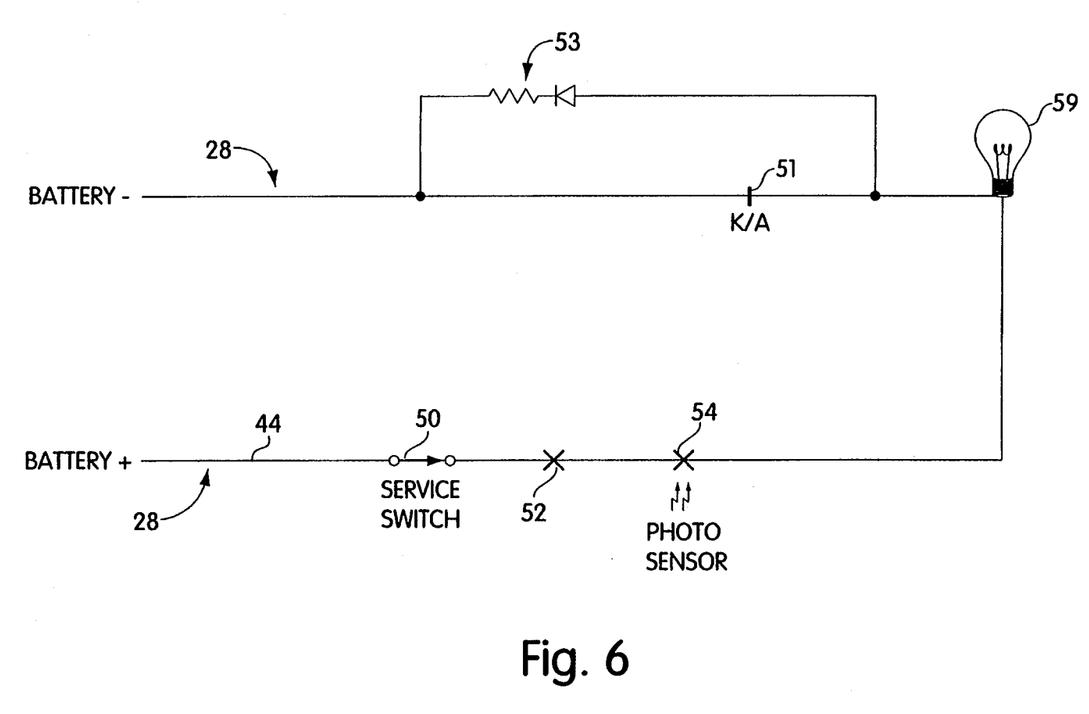
FIG. 6 is an electrical schematic of one embodiment of a power module that provides a DC driving voltage to be used by a dedicated back-up incandescent lamp.

FIG. 6 is a schematic diagram for a low cost embodiment of a power module that drives a dedicated incandescent lamp 59 with a DC voltage. Lamp 59 is likely contained within a lamp container and is dedicated for back-up purposes. A DC voltage is supplied on lines 28 (4.8 V). Manually-operable service switch 50, if open, prevents the transmission of power on positive reference line 44. Relay contacts 52 is controlled by a hand-held control (described below) and, if open, prevents the transmission of power on positive reference 44 (see prior discussion for examples of when a user may wish to disable emergency lamplight). Likewise, photo-sensor contact 54 prevents the transmission of power on positive reference 44, if there is sufficient ambient light (see discussion for FIG. 5 for further details). Relay contact 51 closes, as shown, in response to DC relay 26 (FIG. 4). When relay contact 51 closes, lamp 59 is driven by a DC voltage and can supply back-up lighting for 1.5 hours. LED 53 is biased such that, if lamp 59 is functional, LED 53 is on, and if lamp 59 is non-functional, LED 53 is off. Alternative biasing arrangements can be implemented.

Figure 7:
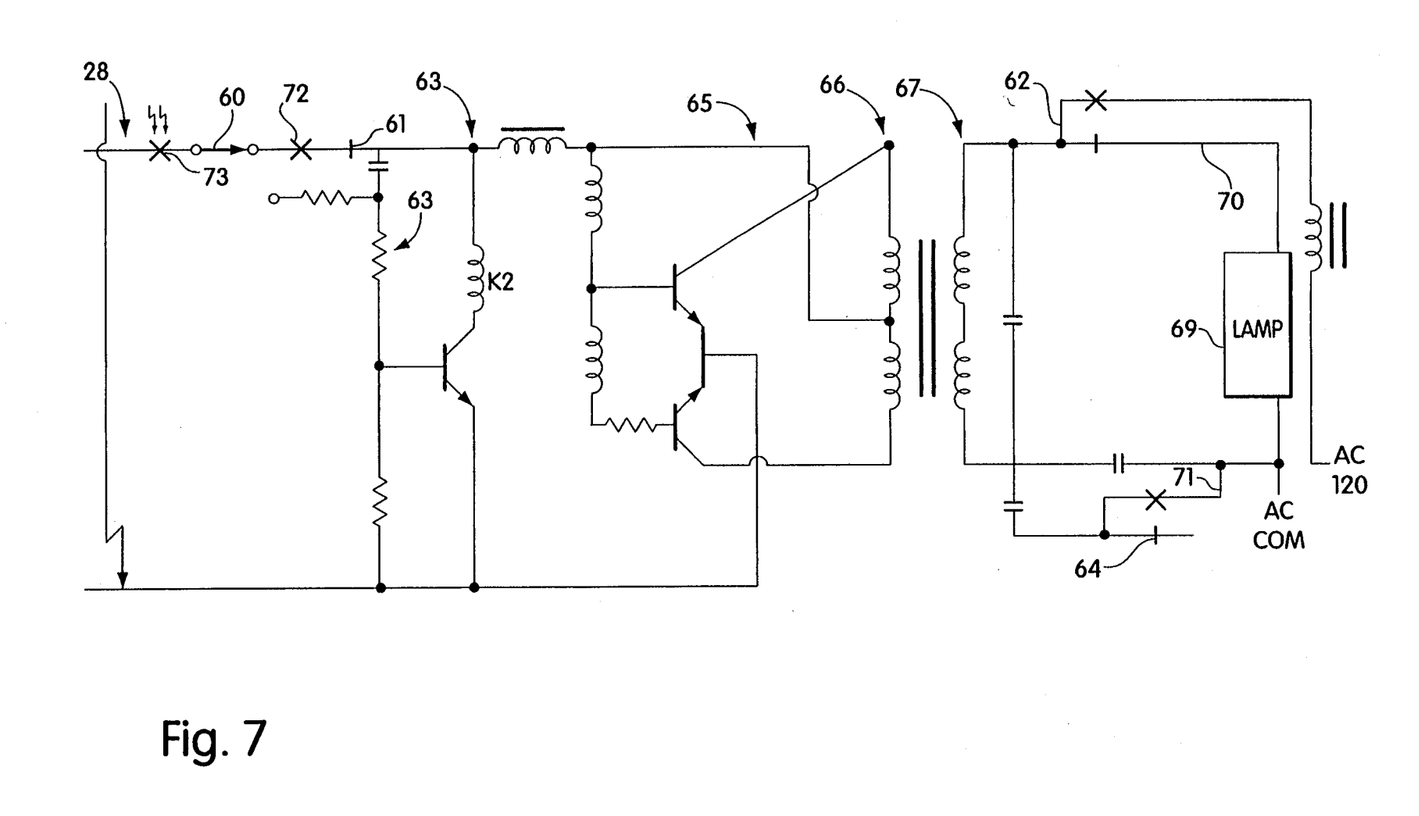
FIG. 7 is an electrical schematic of one embodiment of a power module that provides an AC driving voltage.

Some environments require a higher luminescence than can be provided by the DC driving embodiments. To this end, FIG. 7 is a schematic diagram for one embodiment of power module 10, which drives lamp 69 with an AC voltage. Lines 28 receive 12 volts DC from a battery module (see FIG. 4). This embodiment uses a replaceable 12 volt battery pack, comprised of sub C cell batteries. Unlike prior art systems, which employ non-replaceable battery packs, the replaceable battery pack reduces the overall cost of the system by not requiring the entire system to be replaced when the batteries die.

Manually-operable service switch 60, if open, prevents the transmission of power to the inverter 65. Relay contact 72 corresponds to a hand-held control (described below) and prevents the transmission of power, if the relay is activated. Photo-sensor contact 73 prevents the transmission of power if there is sufficient ambient light. Switches 61 and 62 close, as shown, in response to DC relay 26 (FIG. 4). Relay circuit 63 controls switch 64.

Push-pull inverter 65 receives DC voltage on lines 28 and produces an AC voltage of predetermined frequency. The AC voltage is transmitted to primary winding 66, which couples with secondary winding 67. When relay 26 closes switches 61 and 62, lamp 69 is ionized by an initial start up voltage received on lines 70 and 71. After a predetermined time-delay corresponding to the capacitors and resistors in relay circuit 63, switch 64 is activated. As a result, the voltage on lines 70 and 71 is reduced to a more efficient driving voltage.

The circuit is constructed such that the basic structure can be utilized for different lamp types and tube lengths. To accommodate different tube lengths, the timing and power reducing circuit components are changed to correspond to the necessary timing delays and power reductions that are characteristic of the tube. These components are so arranged to provide easy modification.

Figure 8:
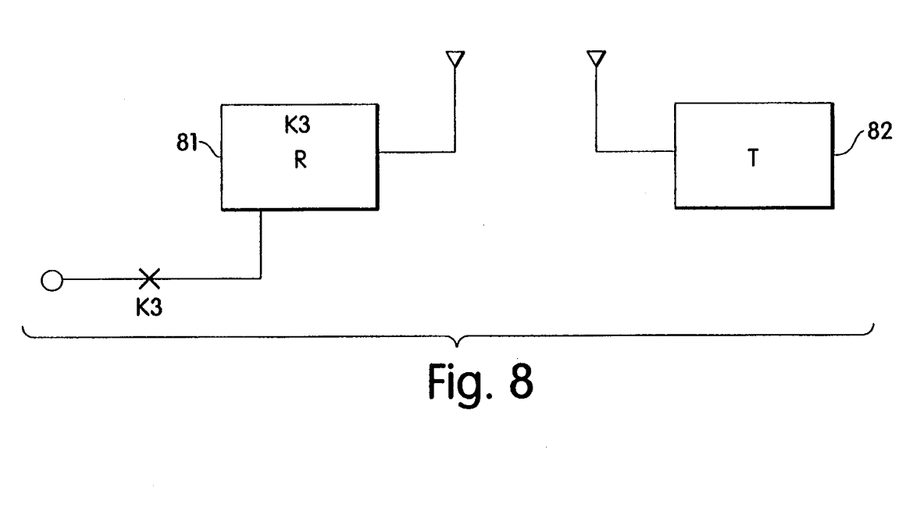
FIG. 8 is a schematic for a hand-held control, including a transmitter and receiver.

Referring to FIG. 8, the hand-held control, i.e., the hand-held control often referred to in prior paragraphs, can use radio frequency, infrared, or other communication techniques. The corresponding relay contacts within the power modules are activated upon a receiver 81 detecting a control signal from the transmitter 82. Likewise, the receiver and transmitter can be such as to detect more than one signal. In this fashion, the test switch 14, referred to previously, can be of a type which is activated remotely rather than manually.

Having thus described several particular embodiments of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended to be limiting. The invention is limited only as defined in the following claims and equivalents thereto.

What is claimed is:

1. A back-up power system for a fixture having at least one lamp that can be driven by AC mains power, said back-up power system comprising:
   a battery module, contained in a first modular housing and including a replaceable battery pack, said battery module providing a back-up output;
   a power module, contained in a second modular housing, the power module receiving the back-up output and providing a driving voltage to drive said at least one lamp when a DC relay detects the absence of AC mains power; and
   a service switch connecting the back-up output to the power module, said service switch disabling the provision of the back-up output to the power module when the service switch is open.

2. A back-up power system for a fixture having at least one lamp that can be driven by AC mains power and by a DC driving voltage, said back-up power system comprising:
   a rechargeable battery pack providing a battery voltage;
   socket means for receiving the battery pack;
   a recharging circuit, receiving AC mains power and providing a recharging current to the battery pack;
   relay means for detecting the absence of AC mains power and for connecting the battery voltage to a inverter and for connecting the DC driving voltage to the fixture to drive the at least one lamp, when AC mains power is detected as absent; said inverter responsively receiving the battery voltage and providing an AC inverter voltage;
   a step-up transformer receiving the AC inverter voltage and providing an AC step-up voltage;
   rectifier means for receiving the AC step-up voltage and for providing the DC driving voltage; and
   further comprising a service switch connecting the battery voltage to the inverter, if the switch is closed, and disconnecting the battery voltage from the inverter, if the switch is open.

3. A back-up power system for a fixture having at least one lamp that can be driven by AC mains power, said back-up power system comprising:
   a battery pack providing a battery voltage, said battery pack being rechargeable by a recharging current;
   socket means for receiving the battery pack;
   a recharging circuit, receiving said AC mains power and providing the recharging current;
   first relay means for detecting the absence of AC mains power and for connecting the battery voltage to a inverter and an AC transformer voltage to the at least one lamp in response to the first relay means detecting the absence of AC mains power;
   a service switch, connecting the battery voltage to the inverter, if the service switch is closed, and disconnecting the battery voltage from the inverter, if the service switch is open;
   said inverter, responsively receiving the battery voltage and providing an AC inverter voltage of a predetermined frequency;
   a transformer, receiving the AC inverter voltage and providing the AC transformer voltage to the transformer output; and
   time-delay relay means for connecting the transformer output to a means for reducing driving voltage, thereby reducing the voltage that drives the at least one lamp, said time-delay relay means being activated a predetermined time after the first relay means detects AC mains power absence.

4. A back-up power system as set forth in claim 3 further comprising a remote transmitter means for transmitting a control signal and a receiver means for detecting the control signal and wherein if said control signal is detected, said receiver means opens a switch to disconnect the battery voltage from the inverter.

5. A back-up power system as set forth in claim 3 further comprising photo-sensing means for disconnecting the battery voltage from the inverter if the photo-sensing means detect a predetermined level of ambient light.

6. A back-up power system as set forth in claim 5 wherein the transmitter and the receiver communicate via radio frequency (RF) communication.

7. A back-up power system as set forth in claim 5 wherein the transmitter and the receiver communicate via infrared communication.

8. A back-up power system as set forth in claim 3 wherein the inverter and the transformer are contained in a first modular housing, and the battery pack and the recharging circuit are contained in a second modular housing.

* * * * *